Patented Mar. 7, 1944

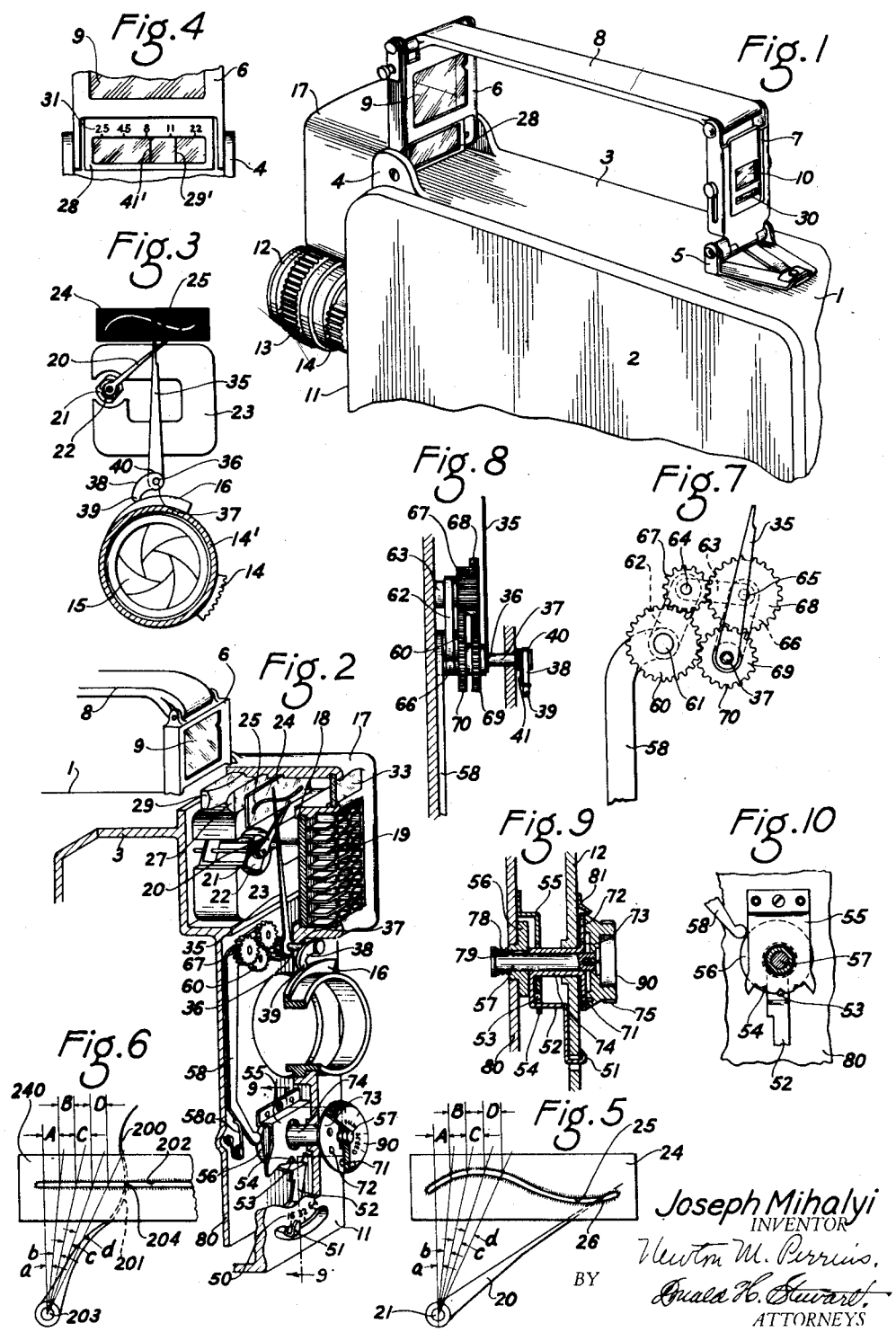

2,343,690

UNITED STATES PATENT OFFICE 2,343,690

CAMERA EXPOSURE CONTROL

Joseph Mihalyi, Rochester, N. Y., assignor to Eastman Kodak Company, Rochester, N. Y., a corporation of New Jersey Application October 14, 1942, Serial No. 461,921

9 Claims. (Cl. 95—10)

This invention relates to photography and more particularly to camera exposure control mechanism. One object of my invention is to provide a camera with a pointer which may indicate the combined adjustments of various exposure controlling elements. Another object of my invention is to provide a camera with a pointer which may be normally moved to indicate the adjustment of a camera diaphragm but which also may be moved by secondary mechanism to compensate for other exposure controlling factors, such as for instance a film speed adjusting element or a shutter speed adjusting element, or both. Another object of my invention is to provide a camera with a pointer which may indicate the combined adjustment of exposure controlling elements for a camera and which pointer may, if desired, be regulated in accordance with the position of a light-sensitive meter pointer to obtain automatically or semi-automatically the required exposure for prevailing light conditions. Other objects will appear from the following specification, the novel features being particularly pointed out in the claims at the end thereof.

Coming now to the drawing wherein like reference characters denote like parts throughout:

Fig. 1 is a fragmentary perspective view of a motion picture camera constructed in accordance with and embodying a preferred form of my invention;

Fig. 2 is a fragmentary and somewhat schematic perspective view partially in section of a typical control mechanism constructed in accordance with my invention;

Fig. 3 is a schematic plan view showing a portion of the adjusting mechanism shown in Fig. 2;

Fig. 4 is a fragmentary view showing the astigmatic images of the meter pointer and diaphragm pointers as they appear to an operator looking through the camera view finder;

Fig. 5 is a diagrammatic view showing one method of changing from angular movement to linear movement;

Fig. 6 is a view similar to Fig. 5 but of a second embodiment of the movement translating mechanism;

Fig. 7 is a schematic view of a part of the adjusting mechanism which may be used on my improved camera;

Fig. 8 is a fragmentary side elevation partially in section of the mechanism shown in Fig. 7;

Fig. 9 is a section taken on line 9—9 of Fig. 2; and

Fig. 10 is a fragmentary front plan view showing a portion of the adjusting mechanism of Fig. 9.

My invention consists broadly in providing an indicating pointer by which the combined adjustments of the various exposure controlling elements of a camera may be indicated either over a suitable scale or in a window in which, by matching the pointer with the pointer of a light-sensitive meter, a correct exposure for prevailing light conditions may be readily brought about.

More specifically, I have illustrated my invention as being applied to a motion picture camera of known type designated broadly as 1, having a side door 2 which may be opened for loading film into the camera and including a top wall 3. This top wall may support brackets 4 and 5 which may carry finder elements 6 and 7 and which may at the same time support a camera handle 8.

A view finder 9 may be carried by the front member 6, there being a rear sight 10 through which the field of view may be seen.

The camera may be provided with a front wall 11 which may support the usual objective in a mount 12 which may include a focusing ring 13 and a diaphragm operating knob 14 attached to a diaphragm ring 14' in such a manner that diaphragm leaves 15 may be opened or closed by turning the knob 14 in one direction or the other. A cam 16 is carried by the diaphragm ring 14' and this cam is utilized for transmitting motion to a pointer 35 as will be hereinafter more fully described.

The front wall 11 of the camera preferably includes a housing 17 which may carry a complete light meter of the dry photovoltaic type, a light-sensitive cell 18 may be mounted behind suitable baffles 19 for controlling the angle of light passing to the light-sensitive element. A window 33 may be positioned above the baffles 19 and may, if desired, be covered by a transparent or translucent material to diffuse the light. Ground glass may be used if desired.

As indicated in Fig. 3, the light meter includes a meter pointer 20 which may swing about its pivot 21 as an armature coil 22 is energized by current in a field magnet 23 which is electrically connected in a known manner with the light-sensitive element 18. Thus the pointer 20 indicates the prevailing condition of light passing through the baffles 19 and falling on the cell 18.

In my copending application Serial No. 461,213, filed October 7, 1942, for Light meter camera, I have described and claimed the particular arrangement of the meter pointer 20 and the masking plate 24 which will now be briefly described.

As indicated in Fig. 5, the meter pointer 20 is pivoted to one side on its pivot 21 so that the angle of the meter arm rapidly changes as it passes across a curved slot 25 in a masking plate 24. The reason for this curved slot is that, as the pointer arm 20 moves through the angles a, b, c, d, etc., it moves through uniform linear distances A, B, C, D, etc., across the curved slot 25 which is plotted to obtain such movement. The reason for this is that the small area of the pointer arm 20—that is area 26—which lies across the opening 25 or slot in the mask plate 24, forms a straight line image in a viewing opening 28 beneath the view finder 9 which may be viewed through the peephole 30 in the bracket 7. The reason such an image is formed is that I mount a cylindrical lens 27 over the mask plate 24 and substantially focus on the meter arm 20 so that the area 26 of the arm appears as an astigmatic image of the arm and it will appear as a straight line 29' when viewed through the view finder and cylindrical lens. If desired, a magnifying lens 29 may be placed behind the cylindrical lens 27 to increase the apparent size of the image.

It is not necessary to have a curved slot 25 and a straight pointer 20 as the modification of my invention shown in Fig. 6 may be used in which the pointer 200 is curved as 201, so that a small area 204 appears in a straight slot 202 in a masked plate 240. Thus, when this pointer turns about its pivot 203, angular movement a, b, c, d, etc., about the pivot is translated into uniform linear movement A, B, C, D, etc., which will appear as before as a straight line 29' in the window 28 beneath the view finder. This structure forms no part of my present invention, but nevertheless, since the structure claimed in the present application does operate with the novel type of meter arm described, it was thought best to include this structure in this application.

The present application is directed particularly to a pointer which may indicate the combined setting of the exposure controlling elements of the camera and may be, therefore, used to set the camera in condition for the exposure required as indicated by the image 29'. If a camera always employed only a single speed and if the film used was always of the same speed, then the diaphragm adjustment would be the only control required. Such, however, is not usually the case. At the present time there are many films having various different speeds and most cameras, even motion picture cameras, are provided with means for varying the shutter speed. Consequently it is necessary to consider all of these factors in obtaining correct exposure.

I prefer to provide a second or control pointer 35 which may move when the diaphragm knob 14 is moved and which may also be moved independently of the diaphragm for other movements of exposure controlling elements such as a film speed control and a shutter speed control. As indicated in Figs. 3 and 8, the diaphragm ring 14 is equipped with a cam 16, this cam contacting with a lever 38 including a cam follower 39, this lever being connected by means of a friction clutch 40 to a shaft 37. A light spring 41 holds the cam follower 39 against cam 16. Thus, when the diaphragm ring 14' is turned, the pointer 35 will be turned and, since it lies adjacent the pointer 20, a straight line image 41' will be formed in the window 28 by the cylindrical lens 27 and the magnifying lens 29 described above. In other words, the pointers 20 and 35 move through closely adjacent planes so that the cylindrical lens 27 forms an astigmatic image which results in the straight line images 29' and 41' shown in Fig. 4. Thus, if the image 41' is brought into registration with the image 29' and if the pointer 35 indicates the combined adjustment of all of the exposure controlling elements, the exposure will be correct.

In order to take care of the other exposure controlling elements—here shown as a shutter speed controlling element 51 and a film speed controlling element 80—the following structure is employed. The shutter speed controlling element consists of a lever having a pointer 51 movable over a scale 50, here graduated into the number of frames per second. The setting indicated in Fig. 2 is for sixteen frames per second. The arm 52 extends upwardly and is provided with a pin 53 which may snap into detents 54 on a spring plate 55 to hold the arm in a set position. This arm is carried by a sleeve shaft 74 terminating in the disk 73 which has a plurality of perforations 72, any one of which may be engaged by a pin 71 on the knob 80. This knob is attached to a shaft 57 which may be moved axially against the pressure of spring 78 so that the collar 79 may compress the spring to normally hold a pin 71 in engagement with an aperture 72. However, by drawing out on the knurling 75 of the knob 80, it might be turned until the desired film speed on the knob is indicated by a pointer 81 attached to a plate 12. The shaft 57 is splined to a cam 56 so that this shaft, and with it the cam, may be turned either by turning the knob 90 or by turning the shutter speed pointer 51. In either case the cam 56 turns so that an adjusting arm 58 riding on the cam will move.

Thus lever 58 can be used for transmitting the setting of either of the exposure controlling elements of the camera to the indicating pointer 35, this being accomplished through the mechanism best shown in Figs. 7 and 8 which will now be described.

Arm 58, which is moved by the cam 56, causes a linkage composed of the links 62, 63, and 66 to move. These links are connected by pivots 61, 64, 65 and shaft 37. The friction of spring 40 upon the shaft 37 tends to hold this shaft stationary so that the gears 60 and 70 remain stationary. As gear 67 moves clockwise about gear 60, gear 68 moves counter-clockwise driving gear 69 and with it the pointer 35 while the lever 58 is being moved. Thus pointer 35 will be moved if either the arm 51 or the knob 90 is moved and it will indicate the combined setting of these two levers. However, during these movements the cam follower 39 does not move, but remains in contact with the cam 16 due to its spring 41.

If the shutter speed has been set and the film speed dial has been set, the pointer 35 has been moved. However, this pointer must also be moved if a diaphragm adjustment is made. This is accomplished in the following manner. If the diaphragm lever 14 is moved, the cam follower 39 moves because of the movement of cam 16. In this instance, as the pointer 35 moves clockwise, all of the gears move together, but the links 62, 63 and 66 remain stationary because the adjusting arm 58 does not move. Thus the pointer 35 moves independently of the adjusting arm 58 so that any diaphragm adjustments will move the arm 35 a corresponding amount A light spring 58a shown in Fig. 2 is used to hold the adjusting arm 58 against the cam 56.

From the above description it will be seen that the pointer 35 will indicate the combined setting of the various exposure controlling elements and that, therefore, since the lever 35 does this, it is only necessary to register it with a properly correlated light-sensitive cell meter pointer in order to obtain the correct exposure. Thus, if the image of the light-sensitive cell pointer 29' indicates the correct exposure by bringing the image 41' of the exposure controlling pointer 35 into coincidence with it, the correct exposure is given.

I have indicated a scale 31 above the window 28. In Fig. 4 this scale is shown as being graduated into units of diaphragm openings because I have found that most people think of exposures in terms of diaphragm openings, but this is not actually correct insofar as the pointer arm for the exposure controlling elements go because the pointer may be moved without moving the diaphragm. However, I find such a scale is quite useful because, by selecting the normal shutter speed and the normal film speed, the diaphragm reading may be made correct and the exposure controlling pointer 35 will only vary when an abnormal shutter speed and an unusual film speed is employed. It is also possible to place an arbitrary scale at 31, but I have found in practice the present scale is quite satisfactory. This is particularly true with motion picture cameras because the depth of focus at any given aperture is usually sufficiently great to make up for any reading which varies from the true aperture which might be indicated on the scale.

With the camera shown in the drawing and described above, the actual operations of making a picture can be accomplished very rapidly and very easily. When the camera is loaded the operator will adjust the film speed knob 90 if necessary and will also adjust the shutter speed. These two movements may slightly alter the position of the arm 58 and may turn the linkage of the gear train to alter the exposure pointer 35 to the required position. For making exposures the operator merely looks through the finder elements 9 and 10 to get the proper field of view and the light passing through the baffles 19 and falling upon the plate 18 adjusts the meter pointer 20 so that the image 29' formed by the cylindrical lens 27, and if desired magnified by the objective 29, will appear as a straight line image 29' as indicated in Fig. 4. The diaphragm knob 14 is then turned until the image 41 is brought into registration with the image 29', at which time the shutter trigger may be depressed to make exposures. All these operations take some time to describe but actually they can be performed very rapidly and in much less time than it takes to describe them.

Should a different exposure be required for a succeeding burst of pictures, the arm 51 is merely moved to the proper position. This, again, adjusts arm 58 so that the pointer 35 may again move independently of the diaphragm to compensate for the difference in shutter speed.

It will thus be seen that I have provided a plurality of exposure controlling elements which are so connected that a single pointer will indicate the combined adjustment of these elements and that this indicator may be used either alone or with the pointer of a light-sensitive cell to determine the exposure required by the setting of the various exposure controlling elements.

What I claim is:

1. An exposure indicating device for cameras comprising, in combination, a camera, an objective and diaphragm carried thereby, a ring constituting a setting member for operating the diaphragm, a shutter mechanism including a lever adapted to be moved to set the shutter speed and constituting a speed setting member, a pointer for indicating the combined setting of the diaphragm setting member and the speed setting member, and mechanism connecting the pointer and said members for moving the former by the latter, said mechanism including a slip clutch between the pointer and one member and epicyclic gearing between the pointer and the other member.

2. An exposure indicating device for cameras comprising, in combination, a camera, an objective and diaphragm carried thereby, a ring constituting a setting member for operating the diaphragm, a shutter mechanism including a lever adapted to be moved to set the shutter speed and constituting a speed setting member, a pointer for indicating the combined setting of the diaphragm setting member and the speed setting member, and mechanism connecting the pointer and said members for moving the former by the latter, said mechanism including a slip clutch between the pointer and one member and epicyclic gearing between the pointer and the other member, and a film speed setting member having a connection with the shutter speed setting mechanism whereby the pointer may be also moved by said film speed setting member.

3. An exposure indicating device for cameras comprising, in combination, a camera, an objective and diaphragm carried thereby, a ring constituting a setting member for operating the diaphragm, a shutter mechanism including a lever adapted to be moved to set the shutter speed and constituting a speed setting member, a pointer for indicating the combined setting of the diaphragm setting member and the speed setting member, and mechanism connecting the pointer and said members for moving the former by the latter, a film speed setting member for moving the pointer through said mechanism, said mechanism including a means for independently transmitting motion from the diaphragm operating member, the shutter setting member and the film speed setting member to said pointer whereby said pointer may indicate a combined setting thereof.

4. An exposure indicating device for cameras comprising, in combination, a camera, an objective carried thereby, a diaphragm, a ring forming a setting member for operating the diaphragm, a pointer operably connected to the diaphragm, said operable connections including a slip clutch, a shutter speed setting member, a film speed setting member, an adjusting arm, means for moving said arm through either of the setting members, and means operable by said arm for transmitting movement to the pointer and independently of the diaphragm whereby said pointer may indicate the combined adjustment of the exposure controlling elements of the camera.

5. An exposure indicating device for cameras comprising, in combination, a camera, an objective carried thereby, a diaphragm, a ring forming a setting member for operating the diaphragm, a pointer operably connected to the diaphragm, said operable connections including a slip clutch, a shutter speed setting member, a film speed setting member, an adjustable arm, means for moving the adjustable arm through the shutter speed setting device and through the film speed setting member, mechanism connecting the adjustable arm and the pointer for transmitting movement through the adjustable arm to the pointer independently of the diaphragm ring.

6. An exposure indicating device for cameras comprising, in combination, a camera, an objective carried thereby, a diaphragm, a ring forming a setting member for operating the diaphragm, a pointer operably connected to the diaphragm, said operable connections including a slip clutch, a shutter speed setting member, a film speed setting member, an adjustable arm, means for moving the adjustable arm through the shutter speed setting device, mechanism connecting the adjustable arm and the pointer for transmitting movement through the adjustable arm to the pointer independently of the diaphragm ring, said means including gearing having one gear mounted on a stud and other gears carried by movable mounts, the gears moving about the stud gear when the adjustable arm is moved, and the gears moving about mounts but not turning about the stud gears when the diaphragm ring is moved.

7. An exposure indicating device for cameras comprising, in combination, a camera, an objective carried thereby, a diaphragm, a ring forming a setting member for operating the diaphragm, a pointer operably connected to the diaphragm, said operable connections including a slip clutch, a shutter speed setting member, a film speed setting member, an adjustable arm, means for moving the adjustable arm through the shutter speed setting device, and through the film speed setting member, mechanism connecting the adjustable arm and the pointer for transmitting movement through the adjustable arm to the pointer independently of the diaphragm ring, said means including epicyclic gearing including a plurality of floating gears and a gear movable on a fixed pivot, a linkage carrying the floating gears, said arm being attached to the linkage for transmitting motion from shutter speed setting device to the pointer through the floating gears carried by the linkage whereby the pointer may be moved thereby.

8. An exposure indicating device for cameras comprising, in combination, a camera, an objective carried thereby, a diaphragm, a ring forming a setting member for operating the diaphragm, a pointer operably connected to the diaphragm, said operable connections including a slip clutch, a shutter speed setting member, a film speed setting member, an adjustable arm, means for moving the adjustable arm through the shutter speed setting device and through the film speed setting member, mechanism connecting the adjustable arm and the pointer for transmitting movement through the adjustable arm to the pointer independently of the diaphragm ring, said means including epicyclic gearing including a plurality of floating gears and a gear movable on a fixed pivot, a linkage carrying the floating gears, said arm being attached to the linkage for transmitting motion from shutter speed setting device to the pointer through the floating gears carried by the linkage whereby the pointer may be moved thereby, said slip clutch providing a means for transmitting motion from said diaphragm to said pointer.

9. An exposure indicating device for cameras comprising, in combination, a camera, an objective carried thereby, a diaphragm, a ring forming a setting member for operating the diaphragm, a pointer operably connected to the diaphragm, said operable connections including a slip clutch, a shutter speed setting member, a film speed setting member, an adjustable arm, means for moving the adjustable arm through the shutter speed setting device and means for moving the adjustable arm through the film setting member, mechanism connecting the adjustable arm and the pointer for transmitting movement through the adjustable arm to the pointer independently of the diaphragm ring, said means including epicyclic gearing including a plurality of floating gears and a gear movable on a fixed pivot, a linkage carrying the floating gears, said arm being attached to the linkage for transmitting motion from shutter speed setting device to the pointer through the floating gears carried by the linkage whereby the pointer may be moved thereby, said slip clutch providing a connection between the diaphragm and the gear turnable on a fixed pivot for turning said gear to adjust said pointer in accordance with movement of the diaphragm.

JOSEPH MIHALYI.